United States Patent
Seo et al.

(10) Patent No.: US 9,516,638 B2
(45) Date of Patent: Dec. 6, 2016

(54) SIGNAL TRANSMISSION/RECEPTION METHOD AND APPARATUS THEREFOR

(71) Applicant: LG ELECTRONICS INC., Seoul (KR)

(72) Inventors: Daewon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 14/405,631

(22) PCT Filed: Apr. 4, 2013

(86) PCT No.: PCT/KR2013/002805
§ 371 (c)(1),
(2) Date: Dec. 4, 2014

(87) PCT Pub. No.: WO2013/191360
PCT Pub. Date: Dec. 27, 2013

(65) Prior Publication Data
US 2015/0173048 A1    Jun. 18, 2015

Related U.S. Application Data

(60) Provisional application No. 61/661,814, filed on Jun. 20, 2012.

(51) Int. Cl.
*H04L 5/14* (2006.01)
*H04B 7/00* (2006.01)
(Continued)

(52) U.S. Cl.
CPC .......... *H04W 72/042* (2013.01); *H04L 1/0031* (2013.01); *H04L 1/1887* (2013.01); *H04W 52/383* (2013.01); *H04W 72/048* (2013.01);
(Continued)

(58) Field of Classification Search
CPC ............. H04L 5/14; H04L 2012/5641; H04L 2012/5642; H04W 28/042
See application file for complete search history.

(56) References Cited

U.S. PATENT DOCUMENTS

| 2010/0169498 A1* | 7/2010 | Palanki | H04W 16/14 709/228 |
| 2011/0039568 A1* | 2/2011 | Zhang | H04W 52/50 455/452.1 |
| 2013/0028149 A1* | 1/2013 | Chen | H04L 5/0005 370/280 |

(Continued)

FOREIGN PATENT DOCUMENTS

| WO | WO 2010/049801 A1 | 5/2010 |
| WO | WO 2011/038768 A1 | 4/2011 |
| WO | WO 2012/034269 A1 | 3/2012 |

*Primary Examiner* — Faruk Hamza
*Assistant Examiner* — Abu-Sayeed Haque
(74) *Attorney, Agent, or Firm* — Birch, Stewart, Kolasch & Birch, LLP

(57) ABSTRACT

The present invention relates to a radio communication system which supports device-to-device (D2D) communication. More particularly, the present invention relates to a method for transmitting a D2D semi-persistent scheduled (SPS) signal in a radio communication system which supports D2D communication, and an apparatus therefor, the method comprising the steps of: receiving priority information of a D2D SPS signal from a base station; determining whether to send the D2D SPS signal or a signal intended for the base station, on the basis of the priority information, in a case where there is a clash, in a particular sub-frame, between the transmission of the D2D SPS signal and the signal intended for the base station; and transmitting the D2D SPS signal to a second terminal if the priority information of the D2D SPS signal has a higher priority than the signal intended for the base station.

16 Claims, 14 Drawing Sheets

(51) Int. Cl.
    *H04L 12/28*     (2006.01)
    *H04J 3/00*     (2006.01)
    *H04W 72/04*     (2009.01)
    *H04W 72/12*     (2009.01)
    *H04W 52/38*     (2009.01)
    *H04W 72/10*     (2009.01)
    *H04L 1/00*     (2006.01)
    *H04L 1/18*     (2006.01)
    *H04L 5/00*     (2006.01)

(52) U.S. Cl.
    CPC ......... *H04W 72/10* (2013.01); *H04W 72/1247* (2013.01); *H04L 1/1812* (2013.01); *H04L 1/1861* (2013.01); *H04L 1/1896* (2013.01); *H04L 5/0055* (2013.01); *H04L 5/0064* (2013.01); *H04L 5/0082* (2013.01); *H04L 5/14* (2013.01)

(56) References Cited

U.S. PATENT DOCUMENTS

| | | | |
|---|---|---|---|
| 2013/0107838 A1* | 5/2013 | Li | H04W 74/0866 370/329 |
| 2013/0178221 A1* | 7/2013 | Jung | H04L 9/0844 455/450 |
| 2013/0229931 A1* | 9/2013 | Kim | H04W 24/10 370/252 |
| 2014/0029596 A1* | 1/2014 | Li | H04W 8/005 370/338 |
| 2014/0185544 A1* | 7/2014 | Jang | H04L 5/0007 370/329 |
| 2014/0241262 A1* | 8/2014 | Novak | H04W 72/042 370/329 |
| 2014/0269338 A1* | 9/2014 | Jung | H04L 5/0055 370/241 |
| 2014/0355529 A1* | 12/2014 | Zhu | H04N 21/2365 370/329 |
| 2015/0189624 A1* | 7/2015 | Lahetkangas | H04W 72/082 370/329 |

* cited by examiner

SIGNAL TRANSMISSION/RECEPTION METHOD AND APPARATUS THEREFOR

CROSS REFERENCE TO RELATED APPLICATIONS

This application is the National Phase of PCT/KR2013/002805 filed on Apr. 4, 2013, which claims priority under 35 U.S.C. 119(e) to U.S. Provisional Application No. 61/661,814 filed on Jun. 20, 2012, all of which are hereby expressly incorporated by reference into the present application.

TECHNICAL FIELD

The present invention relates to a wireless communication system, and more particularly, to a method of transmitting and receiving an SPS (semi-persistent scheduled) signal in a D2D (device-to-device) communication system and an apparatus therefor.

BACKGROUND ART

Generally, a device-to-device (hereinafter abbreviated D2D) communication literally means a communication between one electronic device and another electronic device. In a broad sense, the D2D communication may mean a wire/wireless communication between electronic devices or a communication between a human-controllable device and a machine. Recently, the D2D communication may generally indicate a wireless communication between electronic devices performed without human involvement.

In the early 1990's, in which the concept of the D2D communication has been initially introduced, the D2D communication has been recognized as remote control or telematics or the like and derivative markets of the D2D communication were very limitative. Yet, the D2D communication has grown rapidly for past few years and has become the globally noteworthy markets. Specifically, in POS (point of sales) and security related application markets, the D2D communication has considerably influence on such field as fleet management, remote monitoring of machinery and equipment, smart meter for auto-measurement of operating time, consumed heat or electricity quantity on construction machinery equipment and the like. D2D communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of D2D communication, since all machines in which a SIM (subscriber identity module) card is installed are eligible for transmitting and receiving data, a user may remotely manage and control the machines. For instance, a D2D communication technology can be applied to such a wide scope as a vehicle, a truck, a train, a container, a vending machine, a gas tank and the like. Yet, a study on a D2D communication scheme including a base station and D2D user equipments is not entirely satisfactory.

DISCLOSURE OF THE INVENTION

Technical Tasks

One object of the present invention is to provide a method of efficiently transmitting and receiving a signal in a wireless communication system and an apparatus therefor.

Another object of the present invention is to provide a method of efficiently transmitting and receiving a D2D SPS signal in a system supporting D2D communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method of transmitting a device-to-device (D2D) semi-persistent scheduled (SPS) signal by a first user equipment in a wireless communication system supporting a D2D communication, the method comprising receiving priority information of the D2D SPS signal from a base station; when a transmission of the D2D SPS signal and a transmission of a signal to the base station are collided with each other in a specific subframe, determining whether the D2D SPS signal is transmitted or the signal to the base station is transmitted based on the priority information; and when the priority information of the D2D SPS signal indicates a priority higher than a priority of the signal to the base station, transmitting the D2D SPS signal to a second user equipment.

In another aspect of the present invention, provided herein is a user equipment transmitting a device-to-device (D2D) semi-persistent scheduled (SPS) signal in a wireless communication system supporting a D2D communication, the user equipment comprising a radio frequency (RF) module; and a processor, the processor configured to receive priority information of the D2D SPS signal from a base station via the RF module, when a transmission of the D2D SPS signal and a transmission of a signal to the base station are collided with each other in a specific subframe, determine whether the D2D SPS signal is transmitted or the signal to the base station is transmitted based on the priority information, when the priority information of the D2D SPS signal indicates a priority higher than a priority of the signal to the base station, transmit the D2D SPS signal to a second user equipment via the RF module.

Preferably, the priority information of the D2D signal may be received via a first field indicating a modulation and coding scheme among uplink grant downlink control information (DCI) used for transmitting the D2D SPS signal.

More preferably, at least one bit of the first field may indicate the priority information, and remaining bits of the first field may be associated with the modulation and coding scheme.

Preferably, the uplink grant DCI information may further include transmit power control information, and an initial transmit power of the D2D SPS signal may be adjusted as much as a value indicated by the transmit power control information.

Preferably, the D2D SPS signal may be transmitted using an initial transmit power predetermined according to the priority information.

Preferably, the D2D SPS signal may be transmitted using a modulation and coding scheme predetermined according to the priority information.

Preferably, the priority information of the D2D signal may be received via a field indicating acknowledgement (ACK)/negative acknowledgement (NACK) of a control channel that carries downlink ACK/NACK information.

Preferably, the D2D SPS signal can be transmitted in accordance with an uplink hybrid automatic retransmission request (HARQ) retransmission period.

Advantageous Effects

According to the present invention, a signal can be efficiently transmitted and received in a wireless communication system. And, a D2D SPS signal can be efficiently transmitted and received in a wireless communication system supporting D2D communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In drawings, to prevent the present invention from getting vaguer, procedures and/or steps known to the public are skipped. Wherever possible, the same reference numbers will be used throughout the drawings to refer to the same or like parts.

BEST MODE

Mode for Invention

Figure 1:
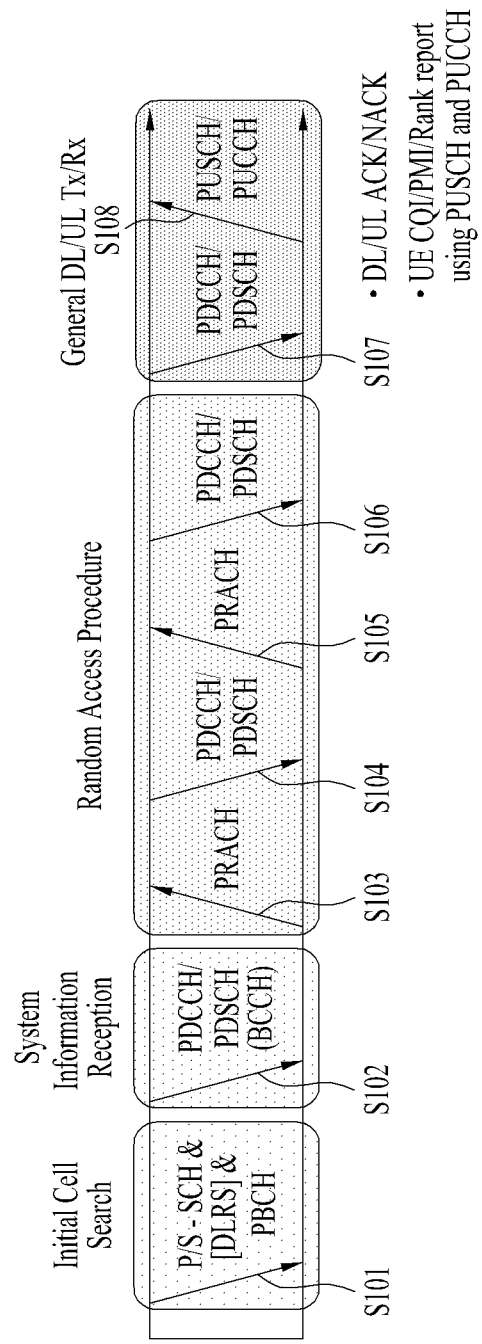
FIG. 1 is a diagram for explaining physical channels used for 3GPP LTE system and a general signal transmission method using the physical channels.

The present invention relates to a D2D (device-to-device) communication system, by which the present invention may be non-limited. The present invention can be applied to all communication systems and methods to which a technical idea of the present invention is applicable.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the present invention mainly concerns 3GPP LTE/LTE-A, by which the technical characteristic of the present invention may be non-limited. Specific terminologies used in the following description are provided to help understand the present invention and the use of the specific terminologies can be modified into a different form in a range of not deviating from the technical idea of the present invention.

In this disclosure, if a prescribed part "includes" a certain component, it means not to exclude a different component but to further include the different component unless there is a specific opponent comment. Moreover, such terminologies written in the present specification as "unit", "module" and the like indicate a unit processing at least one or more functions or operations and these functions or operations can be implemented by hardware, software or a combination thereof.

In this specification, a base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an advanced base station (ABS), a transmission point, an access point (AP) and the like.

In the present invention, a terminal indicates a terminal becoming a target of signal transmission and reception in a wireless communication system according to the present invention. A terminal may correspond to such a fixed device as a personal computer (PC) and a device mounted on a vehicle as well as such a mobile device equipped with a communication function as a cellular phone, a PDA, a smartphone, a wireless modem, a notebook and the like. In the present specification, 'terminal' may be substituted with such a terminology as a user equipment (UE), a mobile equipment (ME), a mobile station (MS), a user terminal (UT), a subscriber station (SS), a wireless device, a handheld device, an access terminal (AT), a device and the like.

Embodiments of the present invention may be supported by the disclosed standard documents of at least one of wireless communication systems including IEEE 802 system, 3GPP system, 3GPP LTE (long-term evolution) and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

In the following, preferred embodiments according to the present invention are explained in detail with reference to attached drawings.

FIG. 1 is a diagram for explaining physical channels used for 3GPP LTE system and a general signal transmission method using the physical channels.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CSI (channel state information) and the like. The CSI includes CQI (Channel Quality Indication), PMI (Precoding Matrix Indication), RI (Rank Indication) and the like. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
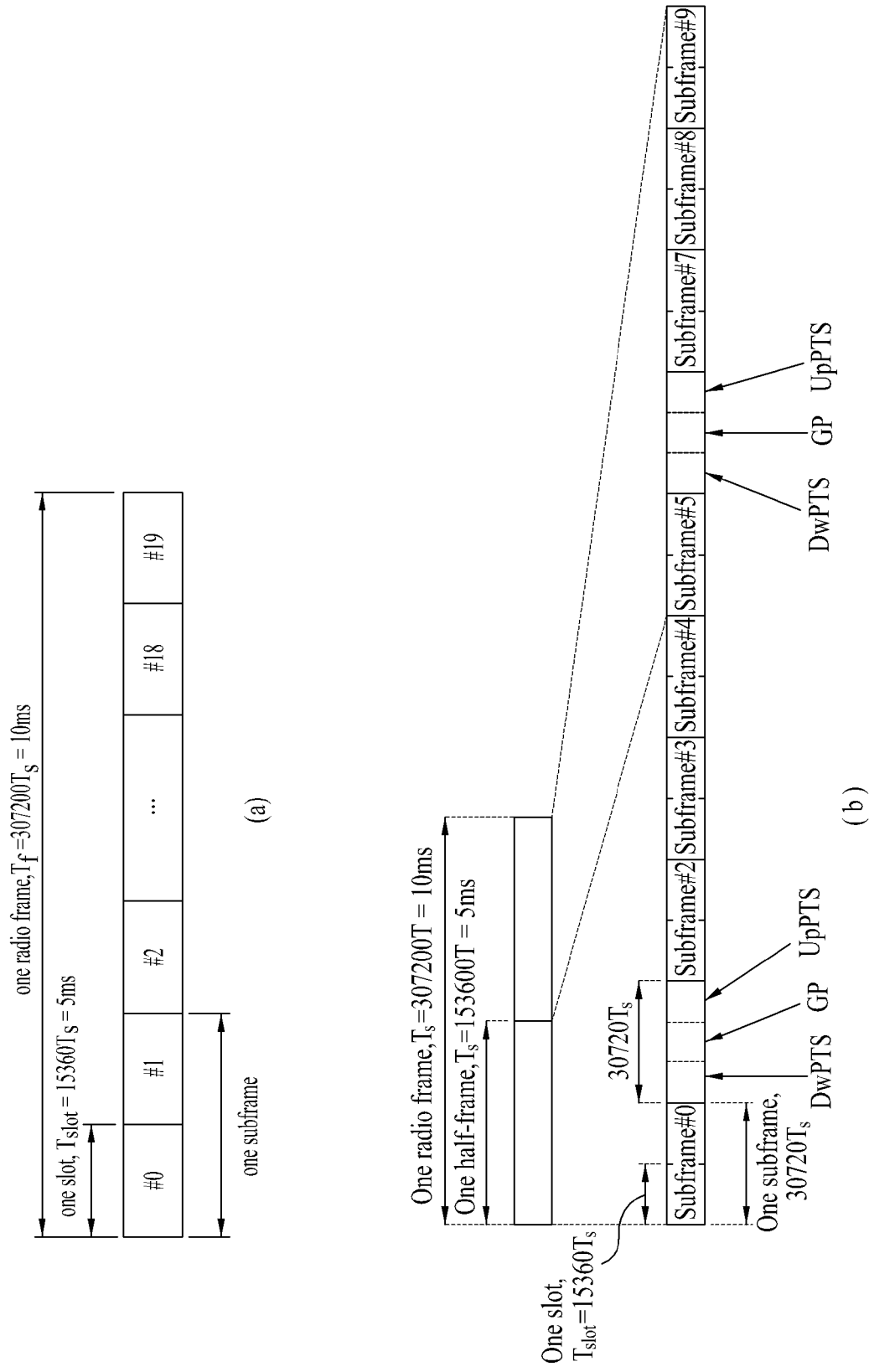
FIG. 2 is a diagram for an example of a radio frame structure.

FIG. 2 is a diagram for an example of a radio frame structure. In a cellular OFDM radio packet communication system, UL/DL (uplink/downlink) data packet transmission is performed by a unit of subframe (SF). And, one subframe is defined as a predetermined time interval including a plurality of OFDM symbols. In 3GPP LTE system, a type 1 radio frame structure applicable to FDD (frequency division duplex) and a type 2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms (millisecond) and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type 2 radio frame includes 2 half frames. Each of the half frame includes 5 subframes and includes a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching an uplink transmission synchronization of a user equipment. The guard period is a period for eliminating interference generated in uplink due to multi-path delay of a downlink signal between uplink and downlink. Table I shows an example of UL-DL (uplink-downlink) configuration of subframes in a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe (DL SF), 'U' indicates a UL subframe (UL SF) and 'S' indicates a special subframe. The special subframe includes a DwPTS, a GP and a UpPTS. Table 2 shows an example of configuration of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described structures of the radio frame are exemplary only. And, the number of subframes included in a radio frame, the number of slots included in the subframe and the number of symbols included in the slot may be modified in various ways.

Figure 3:
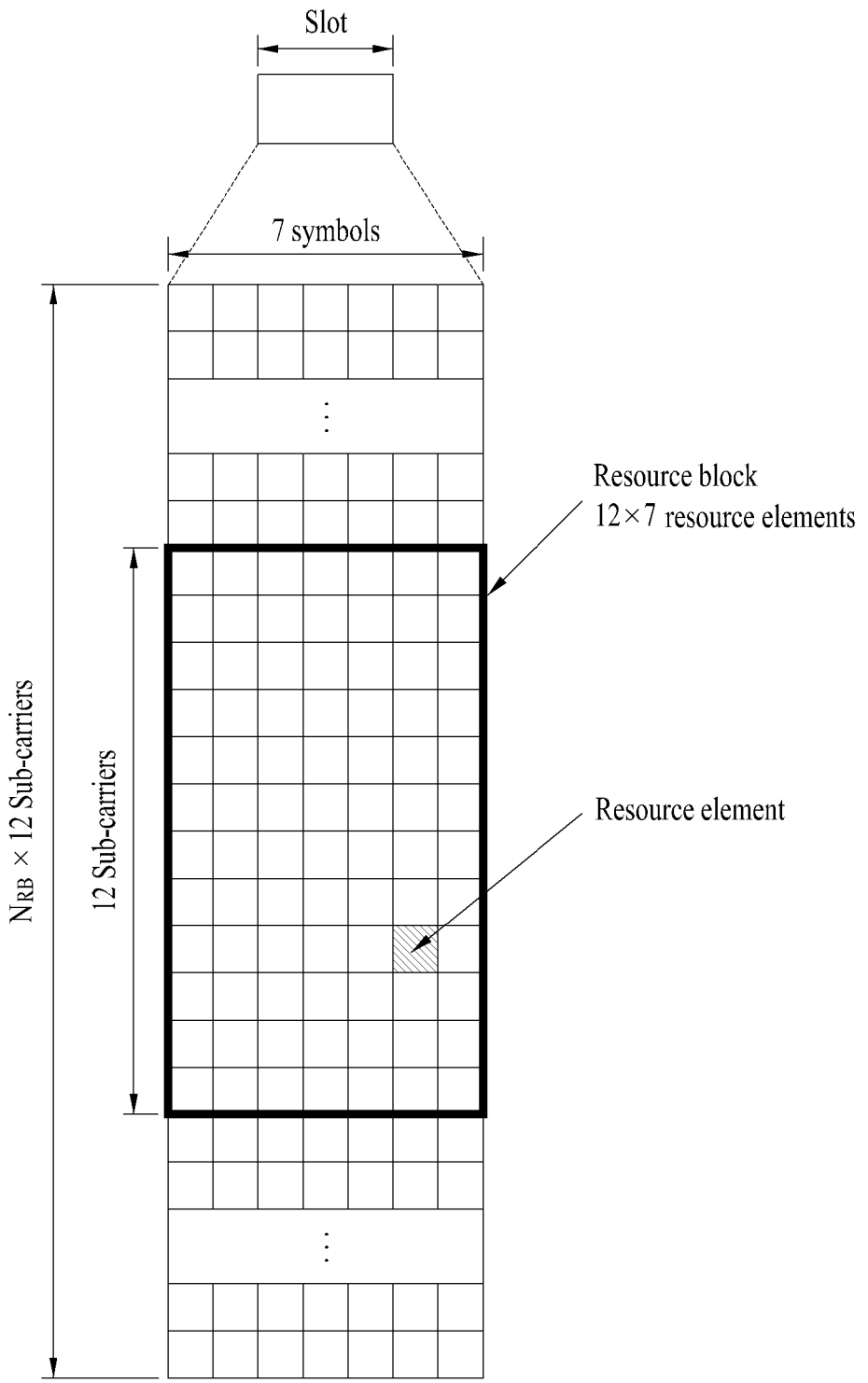
FIG. 3 is a diagram for an example of a resource grid for a downlink slot.

FIG. 3 is a diagram for an example of a resource grid for a downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited. Each element on a resource grid is called a resource element (RE). One resource block includes 12×7 resource elements (REs). The number $N_{DL}$ of resource blocks included in a DL slot may depend on a DL transmission bandwidth. And, the structure of an uplink (UL) slot may be identical to that of the DL slot.

Figure 4:
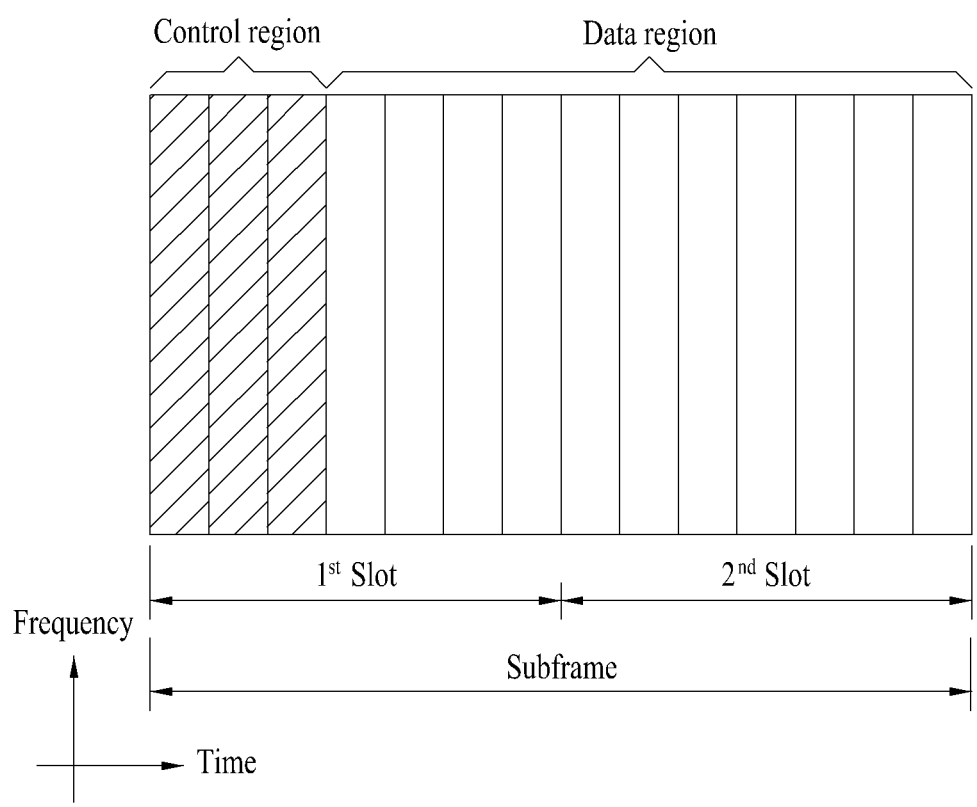
FIG. 4 is a diagram for an example of a structure of a downlink subframe.

FIG. 4 is a diagram for an example of a structure of a downlink subframe.

Referring to FIG. 4, a subframe includes a plurality of (e.g., 2) time domains multiplexed by TDM (time division multiplexing). A first time domain can be used to transmit a control signal. A second time domain can be used to transmit a data signal. For clarity, the first time domain is called a control region and the second time domain is called a data region. Specifically, maximum 3(4) OFDM symbols situated in a head part of a first slot of one subframe correspond to a control region to which control channels are assigned. The rest of OFDM symbols correspond to a data region to which PDSCH (physical downlink shared channel) is assigned. A basic resource unit of the data region corresponds to RB. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH is transmitted in a first OFDM symbol of a subframe and carries information on the number of OFDM symbols used for a transmission of a control channel within the subframe. The PHICH carries HARQ ACK/NACK (acknowledgment/negative-acknowledgment) signal in response to UL transmission. Control information carried on PDCCH may be called downlink control information (hereinafter abbreviated DCI). The DCI includes UL or DL scheduling information or UL transmit power control command for a random UE group.

A DCI format is defined by a format 0, 3, 3A and 4 for UL and a format 1, 1A, 1B, 1C, 1D, 2, 2A, 2B, 2C and the like for DL. A type of information field, the number of information field, the number of bits of each information field and the like vary according to a DCI format. For instance, the DCI format selectively includes such information as hopping flag, RB assignment, MCS (modulation coding scheme), RV (redundancy version), NDI (new data indicator), TPC (transmit power control), HARQ process number, PMI (precoding matrix indicator) confirmation and the like according to a usage of the DCI format. Hence, a size of control information, which is matched to the DCI format, varies according to the DCI format. Meanwhile, a random DCI format can be used to transmit control information of two or more types. For instance, the DCI format 0/1A is used to carry the DCI format 0 or the DCI format 1 and is distinguished from each other by a flag field.

PDCCH is able to carry resource allocation information and transmission format of DL-SCH (downlink shared channel), resource allocation information and transmission format of UL-SCH (uplink shared channel), paging information on PCH (paging channel), system information on DL-SCH, resource allocation information of an upper layer control message such as a random access response transmitted on PDSCH, a set of transmission power control commands for individual user equipments within a random user equipment group, a transmission power control command, activation of VoIP (voice over IP) indication information and the like. A plurality of PDCCHs can be transmitted in a control region and a user equipment is able to monitor a plurality of the PDCCHs. A base station determines a PDCCH format according to a DCI to be transmitted to a user equipment and attaches a CRC (cyclic redundancy check) to control information. CRC is masked with an identifier (e.g., RNTI (radio network temporary identifier)) according to an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information (more specifically, for a system information block (SIB)), the CRC can be masked with a system information identifier (e.g., SI-RNTI (system information-RNTI). If the PDCCH is provided for a random access response, CRC can be masked with RA-RNTI (random access-RNTI).

PDCCH carries information known as DCI (downlink control information) and the DCI includes resource allocation information and different control information for a UE or a UE group. In general, a plurality of PDCCHs can be transmitted in one subframe. Each of a plurality of the PDCCHs is transmitted using one or more CCEs (control channel elements) and each CCE corresponds to 4 resource elements of 9 sets. The 4 resource elements are called a REG (resource element group). 4 QPSK symbols are mapped to one REG. A resource element allocated to a reference signal is not included in an REG. Hence, the total number of REG in a given OFDM symbol varies according to whether there exists a cell-specific reference signal. An REG concept (i.e., group unit mapping, each group includes 4 resource elements) is also used for a different DL control channel (PCFICH and PHICH). In particular, an REG is used as a basic resource unit of a control region.

Transmission modes used for configuring MIMO technology and information contents of DCI formats are listed in the following.

Transmission Mode (TM)
Transmission mode 1: transmission from a single base station antenna port
Transmission mode 2: transmit diversity
Transmission mode 3: open-loop spatial multiplexing
Transmission mode 4: closed-loop spatial multiplexing
Transmission mode 5: Multi-user MIMO
Transmission mode 6: Closed-loop rank I precoding
Transmission mode 7: transmission using UE-specific reference signal
DCI Format
Format 0: Resource grants for PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustment Table 3 shows an example of control information transmitted by DCI format 0. A bit size of each information field is just an example. A bit size of a field may be non-limited by the Table 3.

TABLE 3

| Information field | Bit(s) |
|---|---|
| (1) Flag for distinguishing format 0/format 1A from each other | 1 |
| (2) Hopping flag | 1 |
| (3) Resource block allocation and hopping resource allocation | $\lceil \log_2(N_{RB}^{UL}(N_{RB}^{UL} + 1)/2) \rceil$ |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

A flag field corresponds to an information field used for distinguishing a format 0 from a format 1A. In particular, the DC1 format 0 and the DCI format 1A have an identical payload size and distinguished from each other by the flag field. A resource block allocation field and a hopping resource allocation field may have a different bit size according to hopping PUSCH or non-hopping PUSCH. A resource block allocation field and a hopping resource allocation field for the non-hopping PUSCH provide $\lceil \log_2 (N_{RB}^{UL}(N_{RB}^{UL}+ 1)/2) \rceil$ bit for resource allocation allocated to a first slot of a UL subframe. In this case, $N_{RB}^{UL}$ corresponds to the number of resource blocks included in a UL slot and is determined according to a UL bandwidth configured in a cell. Hence, a payload size of the DCI format 0 may vary according to the UL bandwidth. The DCI format 1A includes an information field for PDSCH assignment. A payload size of the DCI format 1A may also vary according to a DL bandwidth. The DCI format 1A provides the DCI format 0 with a reference information bit size. Hence, if the number of information bits of the DCI format 0 is less than the number of information bits of the DCI format 1A, '0' is added to the DCI format 0 until the payload size of the DCI format 0 becomes identical to the payload size of the DCI format 1A. A padding field of the DCI format is filled with the added '0'.

Figure 5:
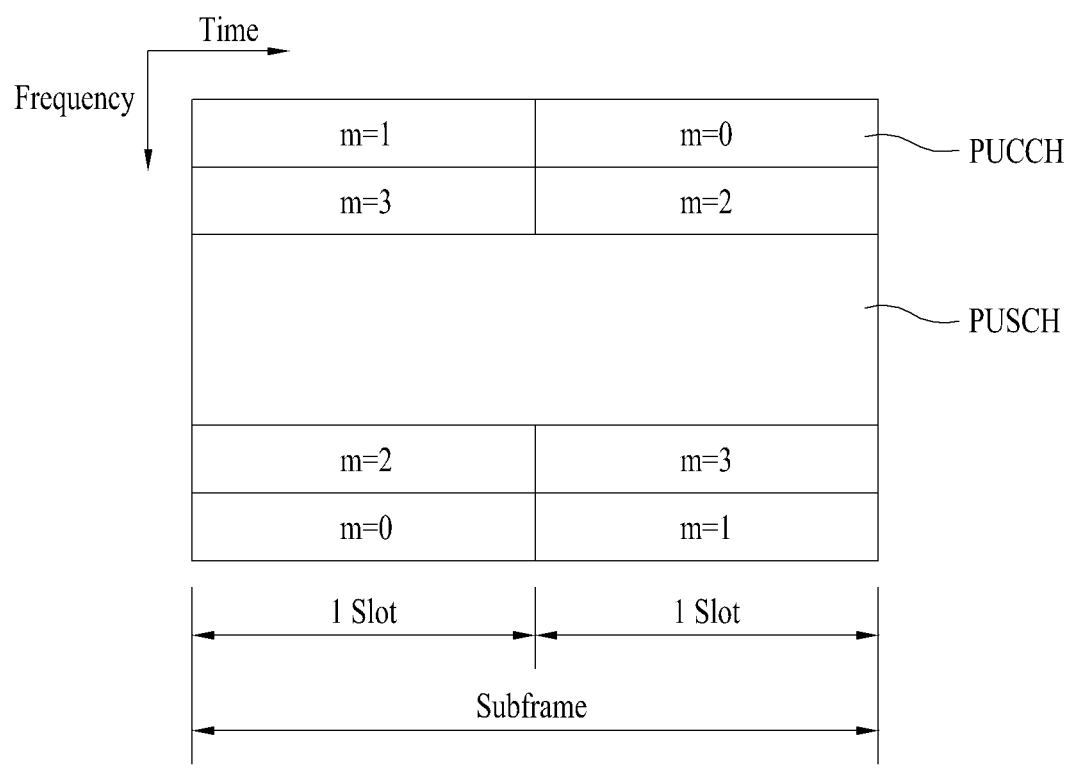
FIG. 5 is a diagram for an example of a structure of an uplink subframe in 3GPP LTE system.

FIG. 5 is a diagram for an example of a structure of an uplink subframe in 3GPP LTE system.

Referring to FIG. 5, an UL subframe includes a plurality of (e.g., 2) slots. A slot may include a different number of SC-FDMA symbols according to a length of a CP. As an example, in case of a normal CP, a slot can include 7 SC-FDMA symbols. An UL subframe can be divided into a data region and a control region in frequency domain. The data region includes PUSCH and is used to transmit a data signal such as audio and the like. The control region includes PUCCH and is used to transmit control information. PUCCH includes an RP pair (e.g., m=0, 1, 2 and 3) situating at both ends of the data region in a frequency axis and hops on a slot boundary. The control information includes HARQ ACK/NACK, CQI (channel quality information), PMI (precoding matrix indicator), RI (rank indication) and the like.

Figure 6:
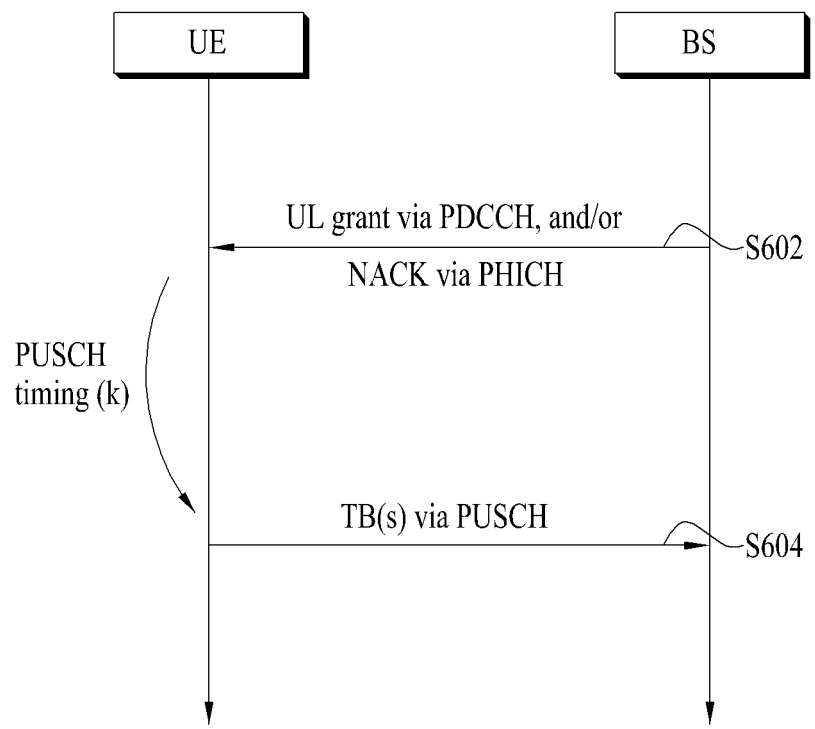
FIG. 6 is a flowchart for an example of PHICH/UL grant (UG)-PUSCH timing.

FIG. 6 is a flowchart for an example of PHICH/UL grant (UG)-PUSCH timing. PUSCH can be transmitted in response to PDCCH (UL grant) and/or PHICH (NACK).

Referring to FIG. 6, a user equipment can receive PDCCH (UL grant) and/or PHICH (NACK) [S602]. In this case, NACK corresponds to ACK/NACK response for a previous PUSCH transmission. In this case, a user equipment undergoes a process (e.g., transport block (TB) coding, transport block-codeword (CW) swapping, PUSCH resource allocation and the like) for PUSCH transmission and may be able to initially transmit/retransmit one or a plurality of transport blocks via PUSCH after a k subframe [S604]. The present example assumes a normal HARQ operation that transmits PUSCH one time. In this case, PHICH/UL grant corresponding to the PUSCH transmission exists in an identical subframe. Yet, in case of performing subframe bundling in a manner that PUSCH is transmitted several times via a plurality of subframes, the PHICH/UL grant corresponding to the PUSCH transmission may exist in a subframe different from each other.

Specifically, if the PHICH/UL grant is detected in a subframe n, a user equipment can transmit PUSCH in a subframe n+k. In case of FDD system, k may have a fixed value (e.g., 4). In case of TDD system, k may have a different value according to a UL-DL configuration. Table 4 shows an UAI (uplink association index) (k) for PUSCH transmission in TDD LTE (-A) system.

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Figure 7:
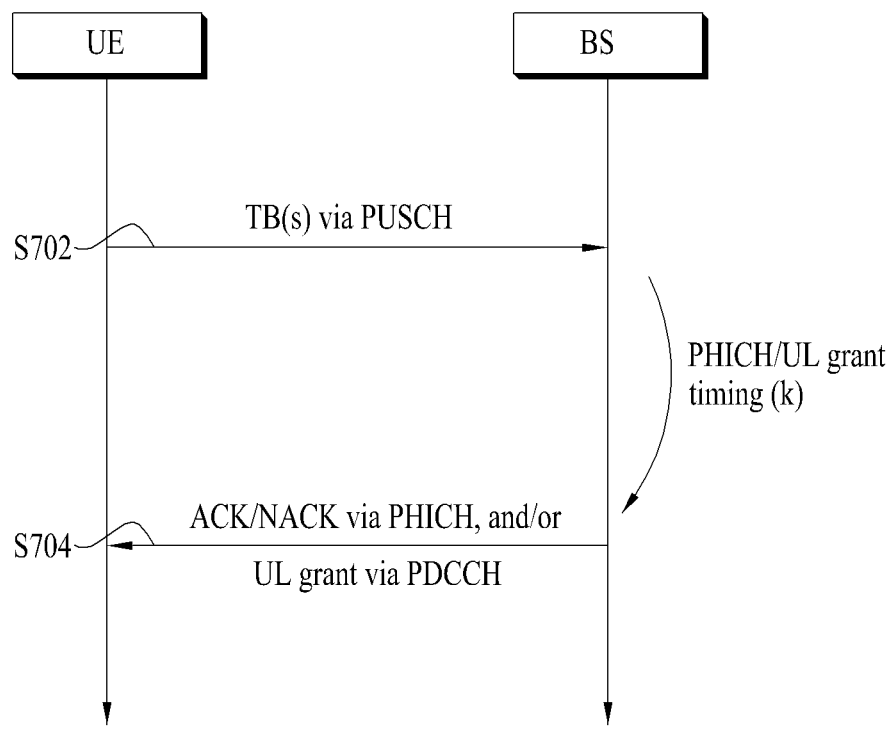
FIG. 7 is a flowchart for an example of PUSCH-PHICH/UL grant timing.

FIG. 7 is a flowchart for an example of PUSCH-PHICH/UL grant timing. PHICH is used to transmit DL ACK/NACK. In this case, the DL ACK/NACK corresponds to ACK/NACK transmitted in DL in response to UL data (e.g., PUSCH).

Referring to FIG. 7, a user equipment transmits a PUSCH signal to a base station [S702]. In this case, the PUSCH signal is used to transmit one or a plurality of (e.g., 2) transport blocks (TBs) according to a transmission mode. A base station undergoes a process (e.g., ACK/NACK generation, ACK/NACK resource allocation and the like) to transmit ACK/NACK and may be then able to transmit the ACK/NACK to a user equipment via PHICH after a k subframe in response to the PUSCH transmission [S704]. The ACK/NACK includes reception response information on the PUSCH signal of the step S702. If a response for the PUSCH transmission corresponds to NACK, a base station can transmit UL grant PDCCH to a user equipment to transmit PUSCH again after the k subframe [S704]. The present example assumes a normal HARQ operation that transmits PUSCH one time. In this case, PHICH/UL grant corresponding to the PUSCH transmission can be transmitted in an identical subframe. Yet, in case of performing subframe bundling, the PHICH/UL grant corresponding to the PUSCH transmission can be transmitted in a subframe different from each other.

Specifically, the PHICH/UL grant of a subframe i corresponds to PUSCH transmitted in a subframe i-k. In case of TDD system, k may have a different value according to a UL-DL configuration. Table 5 shows an UAI (uplink association index) (k) for PUSCH transmission in LTE (-A) system. Table 5 shows an interval between a DL subframe and a UL subframe associated with the DL subframe in terms of the DL subframe in which PHICH/UL grant exists.

TABLE 5

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | 6 |
| 5 | | | | | | | | | 6 | |
| 6 | 6 | 4 | | | | | 7 | 4 | | 6 |

In the following, PHICH resource allocation is explained. If PUSCH is transmitted in a subframe #n, a user equipment determines a corresponding PHICH resource in a subframe #(n+$k_{PHICH}$). In FDD system, $k_{PHICH}$ has a fixed value (e.g., 4). In TDD system, $k_{PHICH}$ has a different value according to UL-DL configuration. Table 6 shows a $k_{PHICH}$ value for TDD.

TABLE 6

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

In the following, HARQ process is explained. A plurality of parallel HARQ processes exist in a user equipment for UL transmission. A plurality of the parallel HARQ processes enable UL transmission to be continuously performed while waiting for receiving HARQ feedback on success or failure of a previous UL transmission. Each of a plurality of the HARQ processes is associated with a HARQ buffer of MAC (medium access control) layer. Each of a plurality of the HARQ processes manages status variables such as the number of transmission of MAC PDU (physical data block) in the buffer, HARQ feedback on MAC PDU in the buffer, a redundancy version (RV) and the like.

In case of LTE (-A) FDD, the number of UL HARQ processes for a non-subframe bundling operation (i.e., a normal HARQ operation) correspond to 8. Meanwhile, in case of LTE (-A) TDD, since the number of UL subframes varies according to a UL-DL configuration, the number of UL HARQ processes and HARQ RTT (round trip time) are also differently configured according to the UL-DL configuration. In this case, the HARQ RTT may correspond to a time interval (e.g., SF or ms unit) from a timing of receiving a UL grant, while transmitting PUSCH (in response to the UL grant), to a timing of receiving PHICH (in response to the PUSCH). Or, the HARQ RTT may correspond to a time interval from a timing of transmitting PUSCH to a timing of retransmitting the PUSCH. If subframe bundling is applied, a bundle of PUSCH consisting of 4 contiguous UL subframes is transmitted in FDD and TDD system. Hence, if the subframe bundling is applied, a HARQ operation/process different from the aforementioned normal HARQ operation/process is performed.

Table 7 shows the maximum number of DL HARQ processes according to UL-DL configuration in TDD system.

TABLE 7

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 8 shows the number of synchronous UL HARQ process and HARQ RTT in TDD LTE system. If UL HARQ RTT corresponds to 10 [SFs or ms] (UL-DL configuration #1, #2, #3, #4 and #5), one UL HARQ process uses one fixed UL SF timing. On the contrary, if the UL HARQ RTT does not correspond to 10 [SFs or ms] (UL-DL configuration #0 and #6), one UL HARQ process uses a plurality of UL SF timings (instead of one fixed UL SF timing) (in a manner of hopping a plurality of the UL SF timings). For instance, in case of a UL-DL configuration #6, PUSCH transmission timing in one UL HARQ process may correspond to following: SF #2: PUSCH=>SF #13: PUSCH (RTT: 11 SFs) =>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs). In this example, an interval of the UL HARQ timing from an SF #2 to an SF #52 corresponds to 60 subframes (e.g., 60 ms). As a different example, in case of a UL-DL configuration #0, an interval of the UL HARQ timing may correspond to 70 subframes (e.g., 70 ms).

TABLE 8

| DL-UL configuration | # of UL SFs | # of HARQ processes | HARQ RTT |
|---|---|---|---|
| #0 | 6 | 7 | 11 or 13 |
| #1 | 4 | 4 | 10 |
| #2 | 2 | 2 | 10 |
| #3 | 3 | 3 | 10 |
| #4 | 2 | 2 | 10 |
| #5 | 1 | 1 | 10 |
| #6 | 5 | 6 | 11 or 13 or 14 |

When TDD UL-DL configuration corresponds to #1~#6 and a normal HARQ operation is performed, if UL grant PDCCH and/or PHICH are detected in a subframe n, a user equipment transmits a corresponding PUSCH signal in a subframe n+k (refer to Table 4) according to PDCCH and/or PHICH information.

When TDD UL-DL configuration corresponds to #0 and a normal HARQ operation is performed, if UL DCI grant PDCCH and/or PHICH are detected in a subframe n, PUSCH transmission timing of a user equipment varies according to a condition. First of all, if MSB (most significant bit) of a UL index in DCI corresponds to 1 or PHICH is received in a subframe #0 or #5 via a resource corresponding to $I_{PHICH}=0$, a user equipment transmits a corresponding PUSCH signal in a subframe n+k (refer to Table 4). Secondly, if LSB (least significant bit) of a UL index in DCI corresponds to 1, PHICH is received in a subframe #0 or #5 via a resource corresponding to $I_{PHICH}=1$, or PHICH is received in a subframe #1 or #6, a user equipment transmits a corresponding PUSCH signal in a subframe n+7. Thirdly, if all of the MSB and the LSB in DCI are set, a user equipment transmits a corresponding PUSCH signal in a subframe n+k (refer to Table 4) and a subframe n+7.

Figure 8:
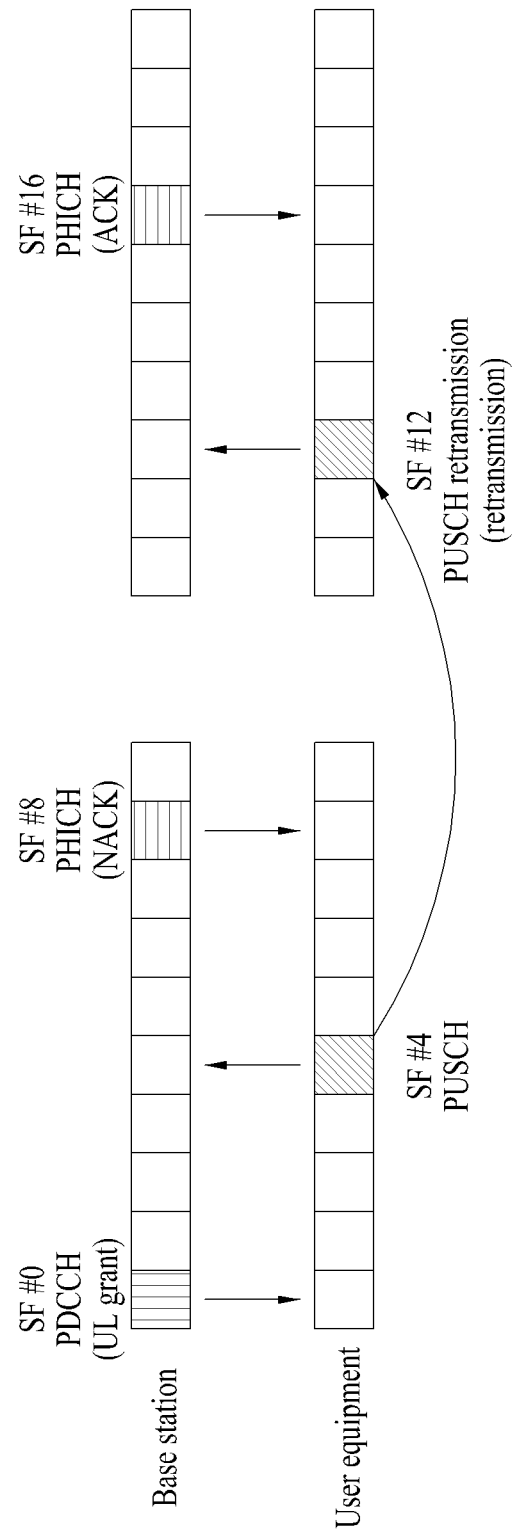
FIG. 8 is a diagram for an example of UL HARQ operation in FDD LTE system.

FIG. 8 is a diagram for an example of UL HARQ operation in FDD LTE system.

An UL HARQ operation includes a synchronous non-adaptive HARQ scheme and an asynchronous HARQ scheme. When the synchronous non-adaptive HARQ scheme is applied, time of retransmission is systemically promised in case that a user equipment scheduled on a specific time is retransmitting (e.g., after 4 subframes from timing of receiving NACK). Hence, a UL grant message transmitted to a base station by the user equipment can be transmitted only on an initial transmission and the UL grant message can be retransmitted by ACK/NACK signal. On the contrary, when the asynchronous HARQ scheme is applied, since retransmission time is not promised between the base station and the user equipment, the base station should send a retransmission request message to the user equipment. Moreover, since a frequency resource and MCS for retransmission vary according to transmission timing, the base station should transmit a user equipment ID, RB allocation information and payload together with HARQ process index, IR version and NDI information in case of sending the retransmission request message to the user equipment.

In LTE system, UL HARQ scheme uses the synchronous non-adaptive HARQ. In case of using 8-channel HARQ, HARQ process numbers are given by 0 to 7. A user equipment, which is scheduled to transmit data to a first process, can perform HARQ retransmission of the data on time of the first process only in case of retransmitting data. One HARQ process operates in every transmission time unit (e.g., subframe).

Referring to FIG. 8, for instance, a base station can transmit a UL grant to a user equipment in a subframe #0 via PDCCH. The user equipment can transmit UL data (e.g., PUSCH) to the base station after 4 subframes (e.g., subframe #4) from timing (subframe #0) of receiving the UL grant using a resource (RB) designated by the UL grant and MCS. The base station can generate ACK/NACK after decoding the UL data received from the user equipment. If the decoding of the UL data fails, the base station can transmit NACK to the user equipment after 4 subframes (e.g., subframe #8) from timing (e.g., subframe #4 ) of receiving the UL data. The user equipment can retransmit the UL data after 4 subframes from timing (e.g., subframe #8) of receiving the NACK. In this case, initial transmission of the UL data and retransmission of the UL data can be performed by an identical HARQ processor (e.g., HARQ process 4).

Figure 9:
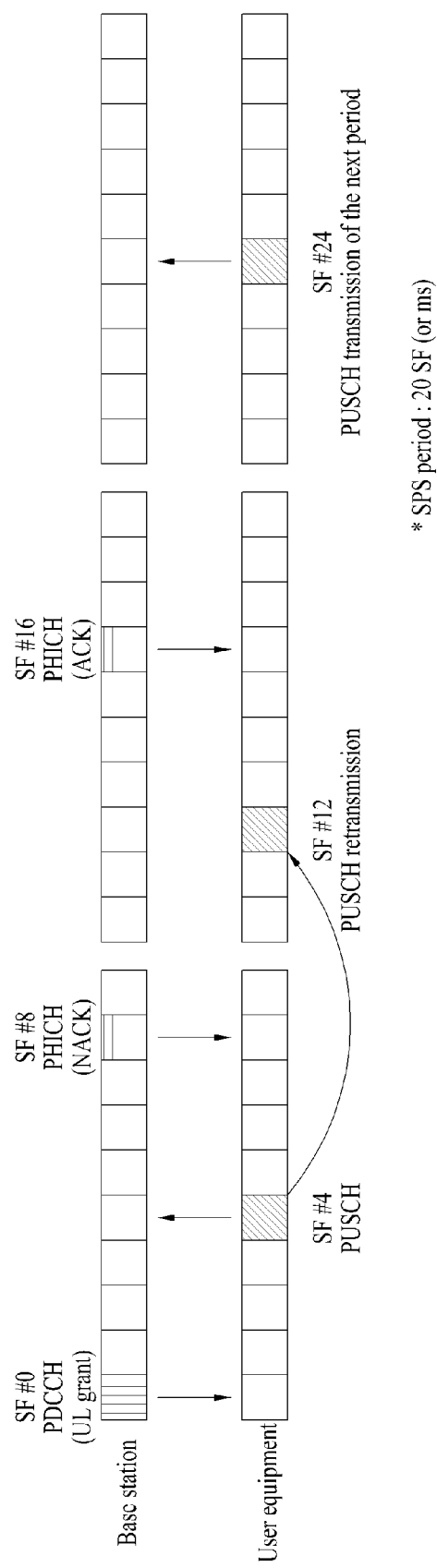
FIG. 9 is a diagram for an example of an operation scheme of uplink SPS (semi-persistent scheduling)

FIG. 9 is a diagram for an example of an operation scheme of uplink SPS (semi-persistent scheduling).

A general unicast data dynamically allocates a resource in every subframe by scheduling. On the contrary, SPS corresponds to a scheduling scheme that reserves a resource in advance for a periodically occurring traffic using such a required data rate of middle/low speed as VoIP (voice over internet protocol) and streaming. The SPS can reduce scheduling overhead and stably allocate a resource in a manner of reserving a resource in advance for a specific traffic.

In LTE system, in case of DL/UL (uplink/downlink) SPS, information on a subframe, which should perform SPS transmission (Tx)/SPS reception (Rx), is given by RRC signaling. Activation, reactivation and release of the SPS are performed via PDCCH. The information on the subframe used for the SPS includes a subframe interval and subframe offset. For clarity, the PDCCH used for indicating the SPS activation, SPS reactivation and the SPS release is called SPS PDCCH. The SPS PDCCH carries RB allocation information for SPS Tx/Rx and MCS (modulation and coding scheme) information. A CRC (cyclic redundancy check) of the SPS PDCCH is masked with an SPS C-RNTI (cell radio network temporary identifier). Hence, although information on a subframe, which should receive SPS, is assigned to a user equipment via RRC signaling, the user equipment does not immediately perform SPS Tx/Rx. If the user equipment receives SPS PDCCH indicating SPS activation (or SPS reactivation), the user equipment performs SPS Tx (e.g., PUSCH transmission) or SPS Rx (e.g., PDSCH reception) in the subframe assigned by the RRC signaling. The SPS Tx/Rx is performed using the RB allocation information and the MCS information carried by the SPS PDCCH in the corresponding subframe. Meanwhile, if the user equipment receives PDCCH indicating the SPS release, the user equipment stops performing the SPS Tx/Rx. If SPS PDCCH indicating SPS activation (or reactivation) is received, the user equipment resumes the SPS Tx/Rx using RB allocation, MCS and the like designated by the SPS PDCCH in a subframe assigned by RRC signaling. In an activated SPS, SPS transmission timing, allocation of an RB to be used, MCS and the like can be changed in a manner of commanding 'reactivation' via PDCCH. Moreover, in the activated SPS, a resource to be used for retransmitting PDSCH/PUSCH, MCS and the like can be changed via PDCCH ("reallocation").

Referring to FIG. 9, assume that a resource allocation interval of SPS is set to 20 ms via upper layer (e.g., RRC) signaling. For instance, a base station transmits SPS PDCCH indicating SPS activation to a user equipment in a subframe #0. According to the present example, the SPS PDCCH includes UL grant information. In this case, a specific RB, MCS and the like designated by the SPS PDCCH are allocated to the user equipment for UL transmission in 20 ms interval after a UL grant message is received by SPS signaling. By doing so, the user equipment can perform the UL transmission using the RB and the MCS designated by the SPS PDCCH in every 20 ms. Meanwhile, in case of using the UL synchronous HARQ scheme, a resource for retransmission is reserved in every 8 ms after an initial transmission. In more particular, if the user equipment receives NACK (negative acknowledgement) in a subframe #8 for an UL data transmitted in a subframe #4, the user equipment performs retransmission in a subframe #12 via a resource reserved for HARQ retransmission. If the user equipment receives ACK (acknowledgement) in a subframe #16 for a UL data transmitted in the subframe #12, the resource reserved for the HARQ retransmission can be used by a different user equipment. The user equipment can perform UL transmission in a subframe #24 using scheduling information received in a subframe #0 via the SPS PDCCH.

Figure 10:
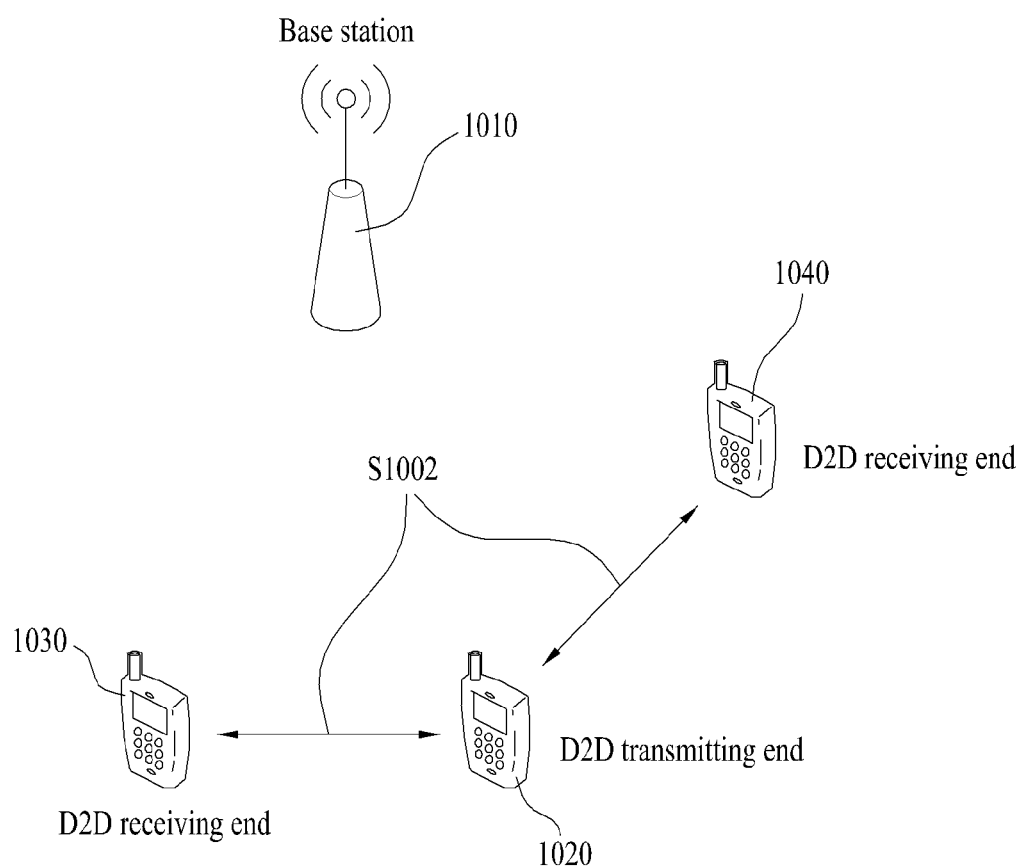
FIG. 10 is a diagram for an example of a D2D (device-to-device) communication system.

FIG. 10 is a diagram for an example of a D2D (device-to-device) communication system. Although the present invention is explained on the basis of one-to-many D2D communication link shown in FIG. 10, the present invention can also be applied to one-to-one D2D communication link, many-to-one D2D communication link or a situation in which a cellular communication link and a D2D communication link are mixed. In the present specification, unlike a legacy communication scheme transceiving a signal between user equipments via a base station, a D2D communication indicates a communication scheme that user equipments exchange a signal with each other via a direct link between the user equipments.

Referring to FIG. 10, there are 3 D2D user equipments 1020/1030/1040 supporting D2D communication and a base station 1010 controlling the D2D user equipments 1020/1030/1040. Although it is not depicted in the drawing, a D2D transmitting end 1020 can transceive control information with the base station 1010. For instance, the D2D transmitting end 1020 can receive control information used for scheduling a data transmission resource from the base station 1010 via a downlink control channel (e.g., PDCCH). For instance, the D2D transmitting end 1020 can receive control information including power-related command used for transmitting data from the base station 1010 via the downlink control channel (e.g., PDCCH).

The D2D transmitting end 1020 can transmit data to D2D receiving end 1030/1040 using the control information received from the base station 1010 [S1002]. For instance, the D2D transmitting end 1020 receives a control channel (e.g., PDCCH) carrying scheduling information for SPS transmission from the base station 1010 and can transmit data to the D2D receiving end 1030/1040 with a prescribed interval via a resource scheduled by an SPS scheme. A target of a periodically transmitted signal is a plurality of unspecified D2D UEs (or a plurality of UEs willing to receive the signal) adjacent to the D2D transmitting end. In particular, the D2D transmitting end can broadcast the signal to all UEs adjacent to the D2D transmitting end via the SPS scheduled resource or can multicast the signal to a part of UEs only among the UEs adjacent to the D2D transmitting end. In the present specification, a scheme of transceiving a signal between D2D UEs via the SPS scheduled resource is defined as D2D SPS (device-to-device semi-persistent scheduling). Although the present specification is explained in an assumption that a D2D SPS signal is broadcasted or multicasted to a plurality of unspecified UEs, the present invention can also be applied to a case that the D2D SPS signal is unicasted to a single D2D UE.

The base station 1010 is able to know locations of the D2D UEs 1020/1030/1040 based on GPS or a location identification technology supported by an LTE system. The base station 1010 can transmit scheduling information for D2D SPS signal transmission to the UEs 1030/1040 adjacent to the D2D transmitting end 1020 based on the locations of the D2D UEs 1020/1030/1040. For instance, the scheduling information for the D2D SPS signal transmission can include a D2D SPS transmission interval and a start point of a resource used for the D2D SPS transmission. For clarity, the scheduling information for the D2D SPS signal transmission is called D2D SPS scheduling information.

As an example of transmitting the D2D SPS scheduling information transmitted by the base station 1010, it may assign a physical control/data channel which is separately designated to transmit the D2D SPS scheduling information. As a different example, the scheduling information can be transmitted in a manner of masking a downlink control channel (e.g., PDCCH) with an identifier (e.g., D2D SPS RNTI) for D2D SPS.

If the D2D transmitting end 1020 receives the D2D SPS scheduling information, the D2D transmitting end 1020 can periodically transmit a signal via a scheduled resource [S1002]. The D2D SPS scheduling information may be used for an uplink data channel (e.g., PUSCH). Yet, it may be non-limited by the uplink data channel. For instance, the D2D SPS scheduling information may be used for an uplink control channel (e.g., PUCCH) or a downlink data/control channel. The D2D receiving end 1030/1040 can also receive the D2D SPS scheduling information from the base station 1010. Hence, the D2D receiving end 1030/1040 can receive a periodically transmitted SPS signal from the D2D transmitting end 1020 using the received D2D SPS scheduling information [S1002]. In the following, methods of efficiently transmitting the D2D SPS signal are proposed. Embodiments described in the following may configure a new embodiment in a manner of being combined with each other. Each of the embodiments can be implemented in a manner of excluding a part of configuration from each of the embodiments.

Embodiment 1

As mentioned in the foregoing description, since a D2D SPS signal is transmitted to a plurality of unspecified UEs and is periodically transmitted, it may be not necessary to have a retransmission operation for the D2D SPS signal. In particular, it is not necessary to perform a HARQ operation for the D2D SPS signal, which is transceived between D2D UEs 1020/1030/1040. And, it may be not necessary to transmit an HARQ ACK/NACK signal. Hence, HARQ retransmission for the D2D SPS signal, which is transmitted in the D2D transmitting end 1020, is not performed. Hence, since HARQ ACK/NACK for the D2D SPS signal is not used, it may not use a downlink control channel (e.g., PHICH) for DL ACK/NACK.

Hence, according to the present embodiment, the D2D transmitting end 1020 does not receive a control channel (e.g., PHICH) for DL ACK/NACK in case of transmitting a D2D SPS signal. And, the D2D transmitting end 1020 can operate as if the D2D transmitting end always receives ACK for a transmitted D2D SPS signal (e.g., PUSCH). Hence, the D2D transmitting end 1020 can always report ACK to upper layer in response to the transmitted D2D SPS signal (e.g., PUSCH). Moreover, the D2D transmitting end 1020 may not try to retransmit the transmitted D2D SPS signal (e.g., PUSCH).

Embodiment 2

As mentioned in the foregoing description, since it is not necessary to retransmit a D2D SPS signal, it is not necessary to receive ACK/NACK response in response to the D2D SPS signal. Hence, the D2D SPS signal may have a characteristic (e.g., PHICHless) that it is not necessary to receive ACK/NACK signal (e.g., PHICH). Yet, it may be preferable to use a specific (UL) HARQ process only for D2D SPS signal transmission to avoid collision with a different (UL) HARQ process in case of transmitting the D2D SPS signal. Hence, a transmission period of the D2D SPS signal can be matched with a UL HARQ timeline (e.g., HARQ retransmission period or HARQ RTT) of a legacy LTE system. For instance, matching the transmission period of the D2D SPS signal with the UL HARQ timeline of the legacy LTE system may mean to use a UL subframe corresponding to a specific UL HARQ process only. When the UL subframe corresponding to the specific UL HARQ process is used only to transmit the D2D SPS signal, it may avoid collision with a different UL HARQ process. For instance, assume that a D2D SPS UE transmits a D2D SPS signal in a specific subframe n. In this case, a subframe m corresponding to a next D2D SPS signal transmission timing can be configured to be a subframe corresponding to a UL HARQ process identical to a UL data (e.g., PUSCH) transmitted in the subframe n.

As an example, in case of FDD system, LTE (-A) system may have HARQ timing of 8 ms period. Hence, D2D SPS transmission period may also have a period of 8 ms or a period of multiple of 8 ms. In case of TDD system, since LTE (-A) system has UL HARQ timing separately defined according to TDD UL-DL configuration, the D2D SPS transmission period may also follow UL HARQ timing separately defined according to the TDD UL-DL configuration. Or, a transmission period of a D2D SPS signal can be separately fixed according to the TDD UL-DL configuration. As an example, as shown in Table 8, in case of TDD UL-DL configuration 0, a transmission period of a D2D SPS signal can be fixed to 70 ms. In case of TDD UL-DL configuration 6, a transmission period of a D2D SPS signal can be fixed to 60 ms. Regarding the rest of the TDD UL-DL configurations, a transmission period of a D2D SPS signal can be fixed to 10 ms. The transmission period of the D2D SPS signal may be fixed by multiple of the above-mentioned period. In a legacy LTE system, UL SPS may have such a period of multiple of 10 ms as 10 ms, 20 ms, 40 ms, 80 ms, 160 ms, 320 ms and 640 ms or such a period of multiple of 32 ms as 32 ms, 64 ms and 128 ms.

Figure 11:
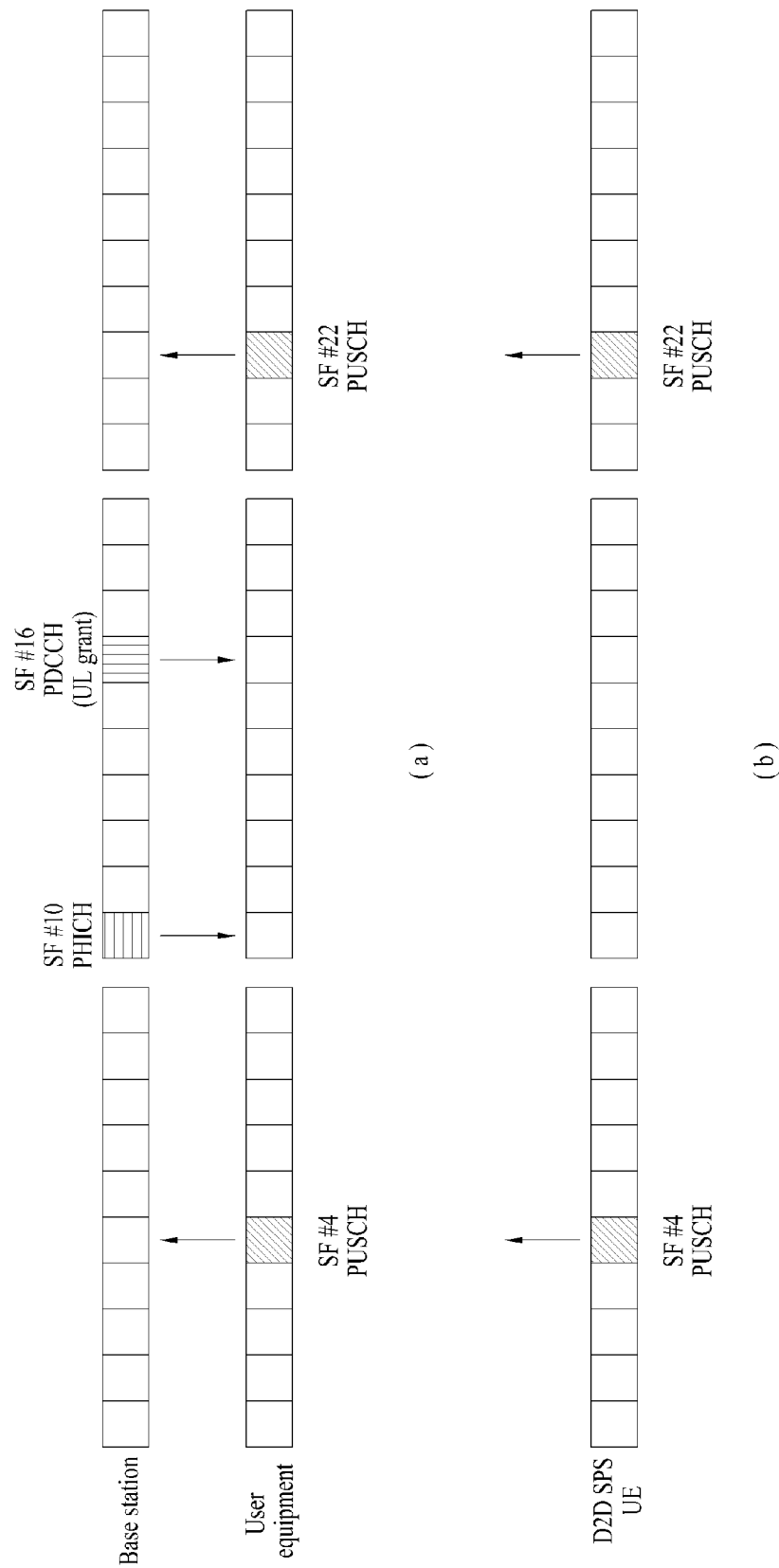
FIG. 11 is a diagram for an example of matching a D2D SPS transmission period to a UL HARQ timeline of a legacy LTE system according to the present embodiment.

FIG. 11 is a diagram for an example of matching a D2D SPS transmission period to a UL HARQ timeline of a legacy LTE system according to the present embodiment.

Referring to FIG. 11(*a*), in an LTE system configured by TDD, a user equipment can transmit uplink data (e.g., PUSCH) to a base station in a subframe #4. The user equipment can receive PHICH (ACK/NACK) in a subframe #10 of a next radio frame according to Table 6. The user equipment can receive a uplink grant (e.g., PDCCH) used for transmitting next uplink data in a subframe #16. Since the user equipment has received the uplink grant in the subframe #16, the user equipment can transmit uplink data (e.g., PUSCH) in a subframe #22 of a next radio frame according to Table 4.

Referring to FIG. 11(*b*), a D2D SPS UE can transmit a D2D SPS signal in the subframe #4 via an uplink data channel (e.g., PUSCH) and can transmit a D2D SPS signal of a next period in the subframe #22 in accordance with the timeline of the legacy LTE system.

Embodiment 3

Figure 12:
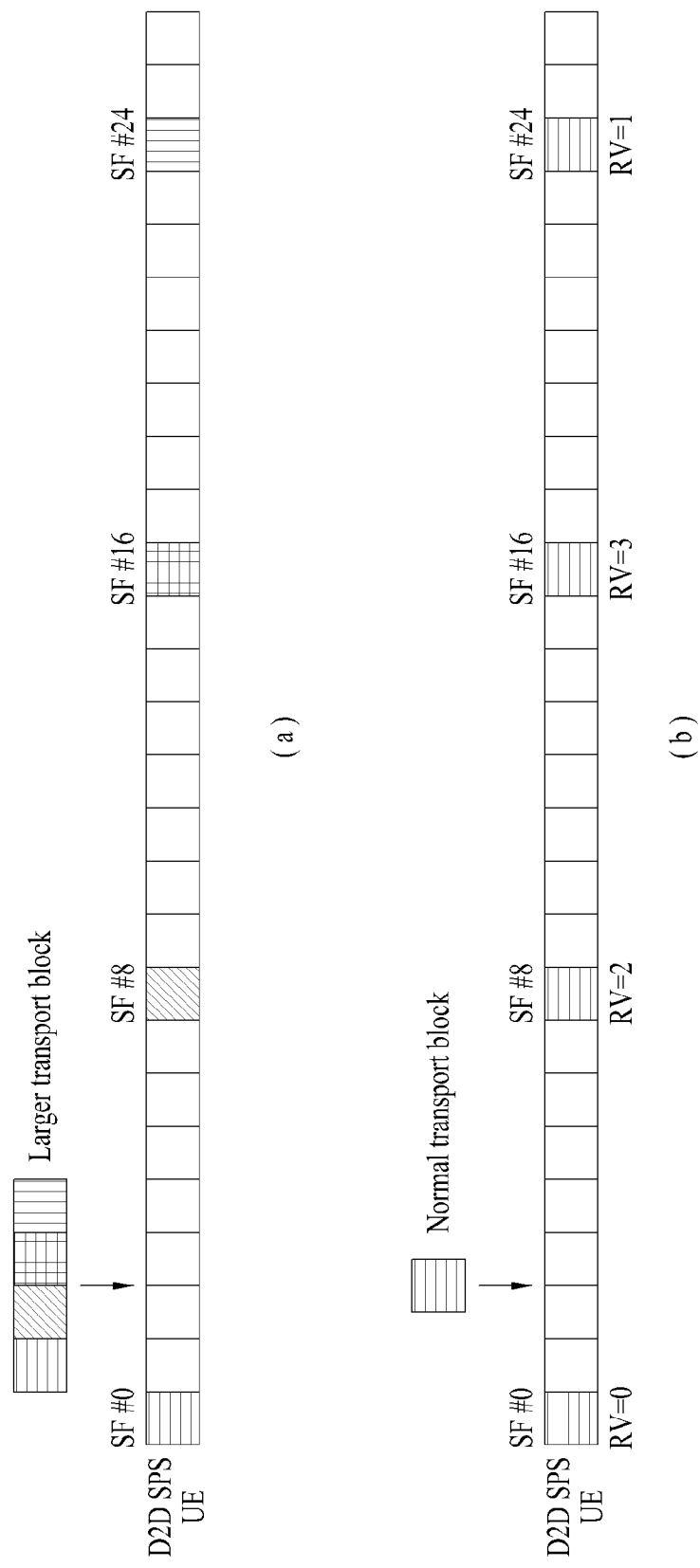
FIG. 12 is a diagram for an example of a method of transmitting a D2D SPS signal according to a third embodiment of the present invention.

FIG. 12 is a diagram for an example of a method of transmitting a D2D SPS signal according to a third embodiment of the present invention. Although FIG. 12 shows a case of FDD system, an identical principle can also be applied to a case of TDD system.

Referring to FIG. 12(*a*), a D2D SPS signal may form a massive data in a manner of being bundled by 2, 4 or several units and the massive data can be transmitted. In this case, the bundled D2D SPS signals can be split into a plurality of lower signal units. A plurality of the lower signal units can be transmitted on transmission timings (e.g., subframe) different from each other of a D2D SPS signal transmission period.

Referring to FIG. 12(*b*), a D2D SPS signal can be transmitted on transmission timings (e.g., subframe) different from each other of a D2D SPS signal transmission period with RV (redundancy version) values different from each other instead of being bundled. In this case, coverage of the D2D SPS signal may be improved. Or, data reliability can be increased. As an example, one D2D SPS signal can be transmitted on transmission periods (e.g., subframe) different from each other with RV values different from each other in a manner of being simply repeated. As a different example, similar to a case of downlink/uplink data (e.g., DL/UL-SCH), a D2D SPS signal can be transmitted on transmission periods different from each other with RV values different from each other in a manner of performing channel coding (e.g., turbo encoding) on the signal.

A method of transmitting a D2D SPS signal according to the present embodiment may be helpful when data of a D2D SPS signal is not sensitive to delay.

Embodiment 4

In LTE system, transmit power used for transmitting uplink data or a control signal (e.g., PUCCH or PUCCH) can be controlled by a base station using a transmission power control command. Yet, since D2D SPS signal transmission is targeting a plurality of unspecified UEs within an adjacent area, it is preferable to set transmit power of a D2D SPS signal to a specific value. For instance, a predetermined fixed value can be used for the transmit power of the D2D SPS signal without being controlled by the transmission power control command. For instance, the set specific value can be used as an initial power value to transmit the D2D SPS signal.

Although a fixed value is used for the transmit power of the D2D SPS signal, a base station can increase or decrease the transmit power (using a closed loop scheme) by a request of an individual D2D reception UE. To this end, a D2D reception UE can inform the base station of control information on the transmit power of the D2D SPS signal via upper layer signaling such as RRC and the base station may use a separate power control command independent of a legacy power control for a UL channel. Or, the base station may use a power control command used for controlling the power of the legacy UL channel. As an example, the D2D reception UE may immediately report a reception SNR (signal-to-noise ratio) (or SINR (signal to interference plus noise ratio)) value to the base station. As a different example, the D2D reception UE may report the reception SNR (or SINR) value to the base station by averaging the value for a prescribed time. The base station can determine transmit power of a D2D transmission UE by using the information reported by the D2D reception UEs and considering a total network impact. The base station can indicate the D2D transmission UE to change transmit power via a UL grant, i.e., the UL grant for D2D SPS transmission based on the determined transmit power information (e.g., a TPC field of a DCI format).

Figure 13:
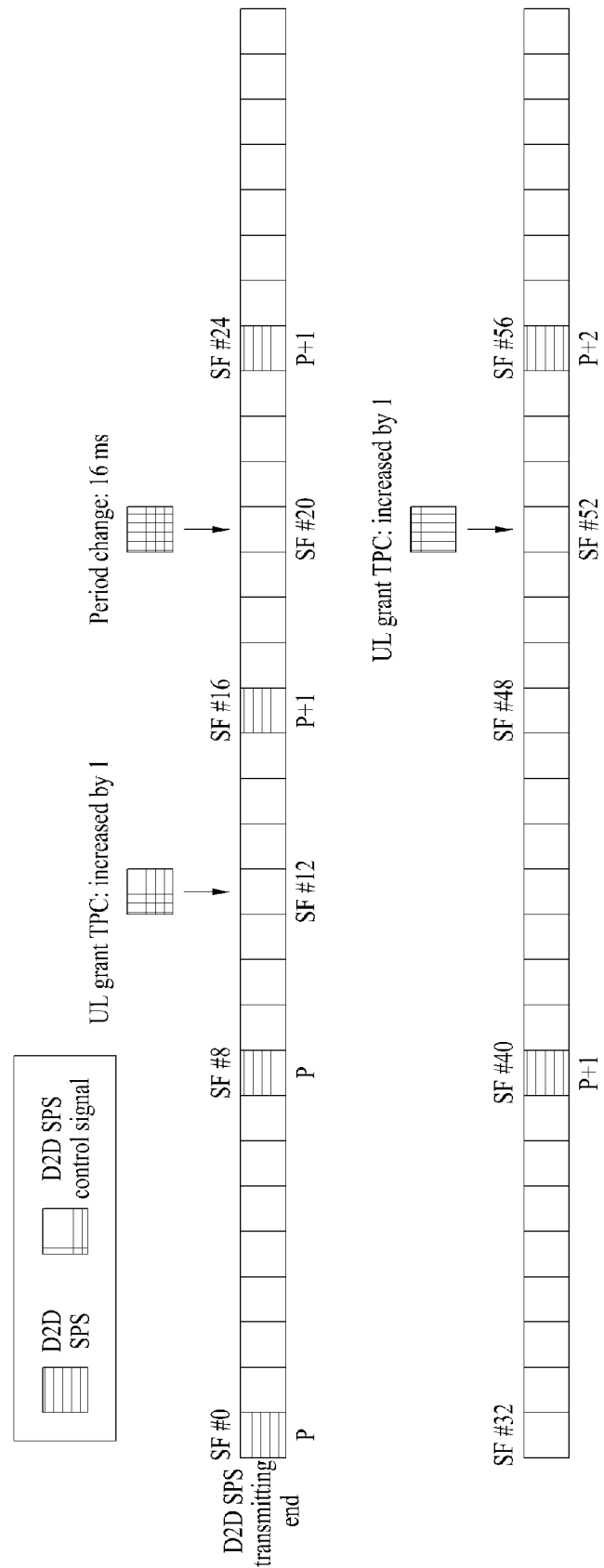
FIG. 13 is a diagram for an example of changing D2D SPS transmit power and a period according to the present embodiment.

FIG. 13 is a diagram for an example of changing D2D SPS transmit power and a period according to the present embodiment. A D2D SPS transmitting end 1020 is configured by FDD and can transmit a D2D SPS signal according to a HARQ timeline in accordance with a second embodiment. For instance, the D2D SPS transmitting end 1020 can be configured to perform a D2D SPS operation with a period of 8 subframes (e.g., 8 ms) and initial transmit power P. Yet, the D2D SPS transmit power can change by a request of at least one of D2D SPS receiving ends 1030/1040. According to the present example, a base station 1010 can indicate the D2D transmitting end 1020 to increase the D2D SPS transmit power as much as 1 in a subframe #12 and a subframe #52 by the request of at least one of the D2D SPS receiving ends 1030/1040. Then, the D2D transmitting end 1020 can transmit a D2D SPS signal on a next transmission period (e.g., subframe #16 or subframe #56) using the transmit power increased as much as 1.

According to the example shown in FIG. 13, a D2D SPS signal transmission period can also be changed. The base station 1010 can indicate the D2D SPS transmitting end 1020 to change a transmission period of a D2D SPS signal via an upper layer signal such as RRC signaling. In the present example, the D2D SPS transmitting end 1020 can receive an indication indicating a change of the D2D SPS transmission period from 8 ms to 16 ms from the base station 1010 in a subframe #20. In this case, the D2D SPS transmitting end 1020 transmits a D2D SPS signal in a subframe #24 according to the period of 8 ms, which is a period before being changed, as a next transmission period and may be then able to transmit a D2D SPS signal in a subframe #40 according to the period of 16 ms, which is a period after being changed, for a next transmission.

Although the example of FIG. 13 shows a case of being configured by FDD, an identical principle can also be applied to a case of TDD system.

Embodiment 5

As a fifth embodiment of the present invention, a method for a base station to signal priority of D2D SPS signal transmission is explained.

Since a D2D SPS signal corresponds to not a general two-way communication signal but a one-way communication signal designed for a special purpose, it is preferable to separately configure a priority of D2D SPS signal transmission. In this case, the priority can be differently defined according to a usage of the D2D SPS signal and a type of a requested signal requested by a base station or a different D2D UE. For instance, if the D2D SPS signal is used for an urgent purpose (e.g., disaster information), priority of the signal can be configured to be high to disable a response for the request of the different D2D UE or a response for the request of the base station.

As a different example, in case of assuming that simultaneous transmission of PUSCH/PUCCH is disabled, wideband periodic CQI feedback transmission period (e.g., 10 ms) and a D2D SPS signal transmission period (e.g., 64 ms) may meet in an identical timeline. In this case, the base station 1010 may configure priority of the D2D SPS signal transmission to be higher. The D2D SPS transmitting end 1020 may be then able to ignore a CQI feedback request and transmit a D2D SPS signal in a manner of giving priority on the D2D SPS signal transmission over CQI transmission. On the contrary, in case of a D2D SPS signal of a low priority such as advertising data transmission, the base station 1010 can configure priority of the D2D SPS signal to be low. If a different request is simultaneously made together with the D2D SPS signal, the D2D SPS transmitting end 1020 omits the D2D SPS signal transmission and can preferentially process the requested operation.

If priority of a D2D SPS signal is configured, an MCS level of the D2D SPS signal may depend on priority of an SPS signal. Hence, the MCS level can be fixed by a predetermined value according to each priority or meaning of an MCS value can be configured to be different from each other according to each priority. For instance, if the priority of the D2D SPS signal is configured to be higher, it is able to determine an MCS level used for transmitting a reliable signal. In this case, the MCS level can be determined by such a modulation scheme allocating less number of bits per symbol as QPSK (quadrature phase shift keying). On the contrary, if the priority of the D2D SPS signal is configured to be lower, it is able to determine an MCS level used for transmitting grate amount of data. In this case, the MCS level can be determined by such a modulation scheme allocating large number of bits per symbol as 64QAM (quadrature amplitude modulation). By doing so, since information transmitted via an MCS field of a legacy UL grant DCI format becomes unnecessary or reduced, the MCS field can be reused as a field used for setting priority.

And, a value of an initial transmit power can also be fixed by a predetermined value according to priority configured by a base station. For instance, if the priority is configured to be higher, the initial transmit power can also be configured to be higher for a reliable signal transmission. On the contrary, if the priority is configured to be lower, the initial transmit power can also be configured to be lower to reduce interference.

Table 9 shows an example of reusing an MCS field of a UL grant DCI format as a priority field. As shown in Table 9, the UL grant DCI format may have 5 bits for the MCS field and RV and may have 2 bits for a TPC field.

TABLE 9

| T (time) | Priority (3 bits) | RV (2 bits) | TPC (2 bits) | Resulted SPS power |
|---|---|---|---|---|
| T = 0 ms | 7 (lowest priority) | 0 | 0 | $P_7$ |
| T = 8 ms | 7 (lowest priority) | 2 | none | $P_7$ |
| T = 16 ms | 4 (mid priority) | 3 | +2 | $P_4 + 2$ |
| T = 24 ms | 0 (highest priority) | 1 | −1 | $P_0 + 1$ |

Referring to Table 9, a 3-bit MCS field is reused for priority configuration. Hence, priority of a D2D SPS signal can indicate 8 priorities. Each of the 8 priorities can indicate a priority according to a relation with a different signal. For instance, if the MCS field is configured by a value (e.g., 0) indicating a highest priority, the D2D SPS signal can be preferentially transmitted over all different signals. As a different example, if the MCS field is configured by a value (e.g., 7) indicating a lowest priority, since the D2D SPS signal has a lowest priority, the D2D SPS signal is not transmitted in a corresponding period when the D2D SPS signal is collided with a different random signal in the period. In Table 9, values (e.g., 0, 4 and 7) indicating priorities are just examples only. Different values can be used if necessary.

Referring to Table 9, an initial transmit power value can be configured according to a priority. For instance, if an MCS field is configured by a value (e.g., 0) indicating a highest priority, an initial D2D SPS transmit power can also be determined by a highest level (e.g., $P_0$). As a different example, if the MCS field is configured by a value (e.g., 4) indicating a middle priority, the initial D2D SPS transmit power can be determined by a middle level (e.g., $P_4$) as well. As a further different example, if the MCS field is configured by a value (e.g., 7) indicating a lowest priority, the initial D2D SPS transmit power can be determined by a lowest level (e.g., $P_7$) as well.

As mentioned earlier in Embodiment 4, a base station can indicate transmit power to be controlled via a TPS field by a request of a D2D SPS receiving end. In this case, although an initial transmit power is determined according to a priority, transmit power control, which is indicated by the TPC field, can be maintained as it is. For instance, if a base station configures a priority with a value (e.g., 4) indicating a middle priority and indicates transmit power to be controlled as much as +2 via the TPC field, a D2D SPS transmitting end can transmit a D2D SPS signal using transmit power $P_4+2$ which is increased as much as +2 from the initial transmit power $P_0$. And then, if the base station configures the priority with a value (e.g., 0) indicating a highest priority and indicates the transmit power to be controlled as much as −1 via the TPC field, the D2D SPS transmitting end can transmit a D2D SPS signal using transmit power $P_0+1$ in a manner of adding the previous transmit power control value +2 to the initial transmit power $P_0$ and then reflecting −1 indicated by the TPC field received at this time to the sum.

A transmit power control value received via the TPC field can be initialized when a priority of a D2D SPS signal changes. For instance, referring to an example of Table 9, in case of a UL grant for T=24, if a priority of a D2D SPS signal is changed to 0, a previous transmit power control is ignored and transmit power of T=24 can be determined by $P_0$−1. Or, the transmit power control value received via the TPC field can be ignored when a priority of a D2D SPS signal is changed. For instance, referring to the example of Table 9, in case of a UL grant for T=24, if a priority of a D2D SPS signal is changed to 0, the transmit power control value received via the TPC field is ignored and transmit power of T=24 can be determined by $P_0$.

Table 10 shows a different example of reusing an MCS field of a UL grant DCI format as a priority field. As shown in Table 10, although 2 bits of the MCS field are reused as the priority field, remaining 1 bit can be used as the MCS field as it is.

TABLE 10

| T (time) | Priority (2 bits) | MCS (1 bit) | RV (2 bits) | TPC (2 bits) | SPS power |
|---|---|---|---|---|---|
| T = 0 ms | 3 (lowest priority) | 1 (16 QAM) | 0 | 0 | $P_3$ |
| T = 8 ms | 3 (lowest priority) | 0 (QPSK) | 2 | +1 | $P_3 + 1$ |
| T = 16 ms | 1 (mid priority) | 1 (QPSK) | 3 | +2 | $P_1 + 3$ |
| T = 24 ms | 0 (highest priority) | 0 (BPSK) | 1 | −1 | $P_0 + 2$ |

Referring to Table 10, since the number of bits used as a priority field is reduced to 2 bits, a D2D SPS signal may have 4 priorities. As mentioned earlier with reference to Table 9, in case that transmission timing of the D2D SPS signal is collided with transmission timing of a different signal, each of the 4 priorities can indicate whether the D2D SPS signal is preferentially transmitted or the different signal is preferentially transmitted in corresponding transmission timing.

And, as mentioned earlier with reference to the example of Table 9, initial transmit power of a D2D SPS signal can be determined according to a predetermined value. In this case, a base station can indicate a D2D SPS UE to control the transmit power via a TPC field. Explanation on the example of Table 9 can also be identically applied to an example of Table 10.

A difference between the example of Table 9 and the example of Table 10 is in that 1 bit among an MCS field of a UL grant DCI format can be used to indicate MCS. 1-bit field itself can indicate a modulation and coding scheme. Or, the 1-bit field can indicate a specific modulation and coding scheme in a manner of being connected with a priority.

For instance, when the 1-bit field itself indicates a specific modulation and coding scheme, if the 1-bit field corresponds to 0, it indicates BPSK and if the 1-bit field corresponds to 1, it may indicate QPSK. Or, if the 1-bit field corresponds to 0, it indicates QPSK and if 1-bit field corresponds to 1, it may indicate 16QAM. Besides, a different modulation and coding scheme can be indicated according to a value of the 1-bit field as well.

For instance, when the 1-bit field indicates a specific modulation and coding scheme in a manner of being connected to a priority, if the priority is set to a middle priority (e.g., 1) and the 1-bit field corresponds to 0, the 1-bit field indicates BPSK and if the 1-bit field corresponds to 0, the 1-bit field indicates QPSK. Yet, if the priority is set to a lowest priority (e.g., 3) and the 1-bit field corresponds to 0, the 1-bit field indicates QPSK and if the 1-bit field corresponds to 1, the 1-bit field may indicate 16QAM. Besides, a different modulation and coding scheme can also be indicated according to a value of the 1-bit field and a priority.

As a variation of the example of Table 10, 1 bit among a UL grant MCS field is used to set a priority and remaining 2 bits can be used to set the MCS field. In this case, although the number of priorities, which is capable of being indicated to a D2D SPS transmitting UE by a base station, is reduced, the number of MCS capable of being indicated may increase. Besides, the principle explained in the example of Table 9 and/or Table 10 can also be identically applied to the present variation example.

In order for a base station to signal a priority of a D2D SPS signal to a D2D SPS transmitting UE, fields of a different control channel can be used instead of an MCS level of a UL grant DCI format. As mentioned in the foregoing description, in case of transmitting a D2D SPS signal, it is not necessary for the D2D SPS transmitting UE to receive ACK/NACK in response to the D2D SPS signal. Hence, when the D2D SPS transmitting UE transmits the D2D SPS signal using an uplink channel, a control channel (e.g., PHICH) configured to receive ACK/NACK from the base station in response to the D2D SPS signal may not be used. Hence, the base station can indicate a priority of the D2D SPS signal using a field (e.g., bit) of a control channel (e.g., PHICH) indicating ACK/NACK on ACK/NACK transmission timing for the D2D SPS signal. For instance, the base station can indicate 2 types of priorities to the D2D SPS transmitting end instead of 1-bit ACK/NACK. As a different example, the base station can indicate priority information of a plurality of bits to ACK/NACK fields which are transmitted on PHICH timings different from each other.

Figure 14:
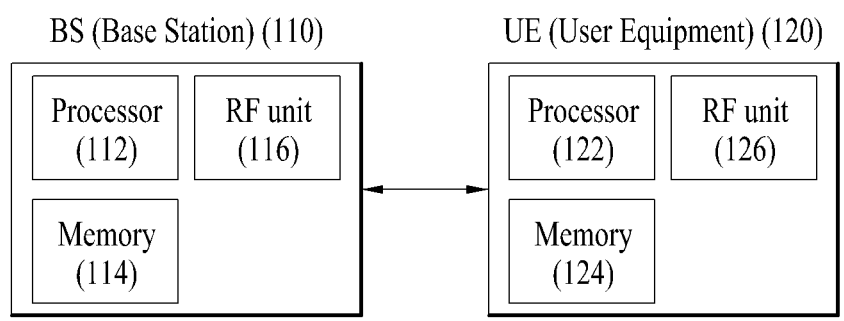
FIG. 14 is a diagram for an example of a base station and a user equipment applicable to the present invention.

FIG. 14 is a diagram for an example of a base station and a user equipment applicable to the present invention.

Referring to FIG. 14, a wireless communication system includes a base station (BS) 110 and a user equipment (UE) 120. If the wireless communication system includes a relay, the BS or the UE can be replaced with the relay.

The base station 110 includes a processor 112, a memory 114, and a RF (radio frequency) unit 116. The processor 112 is configured to implement a function, a procedure and/or a method proposed by the present invention. The memory 114 is connected with the processor 112 and stores various informations associated with operations of the processor 112. The RF unit 116 is connected with the processor 112 and is configured to transmit/receive a radio signal. The user equipment 120 includes a processor 122, a memory 124, and a RF (radio frequency) unit 126. The processor 122 is configured to implement a function, a procedure and/or a method proposed by the present invention. The memory 124 is connected with the processor 122 and stores various informations associated with operations of the processor 122. The RF unit 126 is connected with the processor 122 and is configured to transmit/receive a radio signal.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. And, 'terminal' may be substituted with such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used by such a wireless communication device as a user equipment, a base station and the like.

What is claimed is:
1. A method of transmitting a device-to-device (D2D) semi-persistent scheduled (SPS) signal by a first user equipment in a wireless communication system supporting a D2D communication, the method comprising:
receiving priority information of the D2D SPS signal from a base station, the priority information of the D2D SPS signal is information to configure a priority of a transmission of the D2D SPS signal;
when the transmission of the D2D SPS signal and a transmission of a signal to the base station are collided with each other in a specific subframe, determining whether the D2D SPS signal is transmitted or the signal to the base station is transmitted based on the priority information;
when the priority information of the D2D SPS signal indicates a priority higher than a priority of the signal to the base station, transmitting the D2D SPS signal to a second user equipment: and when the priority information of the D2D SPS signal indicates a priority lower than a priority of the signal to the base station, transmitting the signal to the base station.

2. The method of claim 1, wherein the priority information of the D2D signal is received via a first field indicating a modulation and coding scheme among uplink grant downlink control information (DCI) for transmission of the D2D SPS signal.

3. The method of claim 2, wherein at least one bit of the first field indicates the priority information, and remaining bits of the first field are associated with the modulation and coding scheme.

4. The method of claim 2, wherein the uplink grant DCI information further comprises transmit power control information, and an initial transmit power of the D2D SPS signal is adjusted as much as a value indicated by the transmit power control information.

5. The method of claim 1, wherein the D2D SPS signal is transmitted using an initial transmit power predetermined according to the priority information.

6. The method of claim 1, wherein the D2D SPS signal is transmitted using a modulation and coding scheme predetermined according to the priority information, when the priority information of the D2D SPS signal indicates a priority higher than a priority of the signal to the base station, a modulation and coding scheme level is determined by 64QAM (quadrature amplitude modulation), and when the priority information of the D2D SPS signal indicates a priority lower than a priority of the signal to the base station, the modulation and coding scheme level is determined by QPSK (quadrature phase shift keying).

7. The method of claim 1, wherein the priority information of the D2D signal is received via a field indicating acknowledgement (ACK)/negative acknowledgement (NACK) of a control channel that carries downlink ACK/NACK information.

8. The method of claim 1, wherein the D2D SPS signal is transmitted in accordance with an uplink hybrid automatic retransmission request (HARQ) retransmission period.

9. A user equipment transmitting a device-to-device (D2D) semi-persistent scheduled (SPS) signal in a wireless communication system supporting a D2D communication, the user equipment comprising:

a radio frequency (RF) module; and a processor, the processor configured to:

receive priority information of the D2D SPS signal from a base station via the RF module, the priority information of the D2D SPS signal is information to configure a priority of a transmission of the D2D SPS signal, when the transmission of the D2D SPS signal and a transmission of a signal to the base station are collided with each other in a specific subframe, determine whether the D2D SPS signal is transmitted or the signal to the base station is transmitted based on the priority information, when the priority information of the D2D SPS signal indicates a priority higher than a priority of the signal to the base station, transmit the D2D SPS signal to a second user equipment via the RF module, and when the priority information of the D2D SPS signal indicates a priority lower than a priority of the signal to the base station, transmit the signal to the base station via the RF module.

10. The user equipment of claim 9, wherein the priority information of the D2D signal is received via a first field indicating a modulation and coding scheme among uplink grant downlink control information (DCI) for transmission of the D2D SPS signal.

11. The user equipment of claim 10, wherein at least one bit of the first field indicates the priority information, and remaining bits of the first field are associated with the modulation and coding scheme.

12. The user equipment of claim 10, wherein the uplink grant DCI information further comprises transmit power control information, and an initial transmit power of the D2D SPS signal is adjusted as much as a value indicated by the transmit power control information.

13. The user equipment of claim 9, wherein the D2D SPS signal is transmitted using an initial transmit power predetermined according to the priority information.

14. The user equipment of claim 9, wherein the D2D SPS signal is transmitted using a modulation and coding scheme predetermined according to the priority information, when the priority information of the D2D SPS signal indicates a priority higher than a priority of the signal to the base station, a modulation and coding scheme level is determined by 64QAM (quadrature amplitude mod), and when the priority information of the D2D SPS signal indicates a priority lower than a priority of the signal to the base station, the modulation and coding scheme level is determined by QPSK (quadrature phase shift keying).

15. The user equipment of claim 9, wherein the priority information of the D2D signal is received via a field indicating acknowledgement (ACK)/negative acknowledgement (NACK) of a control channel that carries downlink ACK/NACK information.

16. The user equipment of claim 9, wherein the D2D SPS signal is transmitted in accordance with an uplink hybrid automatic retransmission request (HARQ) retransmission period.

* * * * *